US008090454B1

(12) United States Patent
Breitenbach et al.

(10) Patent No.: US 8,090,454 B1

(45) Date of Patent: Jan. 3, 2012

(54) SYSTEM AND METHOD OF OPTIMIZATION FOR VENDING PLATFORMS

(75) Inventors: Paul T. Breitenbach, Wilton, CT (US); Paul Signorelli, Ridgefield, CT (US); Matthew D. Breitenbach, Ridgefield, CT (US); Colin Marr, Seymour, CT (US); Igor Zhuk, Weston, CT (US); Daniel Signorelli, Wappingers Falls, NY (US)

(73) Assignee: Vendmore Systems, LLC, Stamford, CT (US)

( * ) Notice: Subject to any disclaimer, the term of this patent is extended or adjusted under 35 U.S.C. 154(b) by 323 days.

(21) Appl. No.: 12/410,512

(22) Filed: Mar. 25, 2009

Related U.S. Application Data

(60) Provisional application No. 61/039,138, filed on Mar. 25, 2008.

(51) Int. Cl.
*G05B 13/04* (2006.01)

(52) U.S. Cl. ............. 700/29; 700/295; 62/89; 62/228.1; 62/231; 236/47; 455/403; 455/405

(58) Field of Classification Search .................... 700/29, 700/295; 62/228.1, 89, 231; 455/405, 403; 236/47

See application file for complete search history.

(56) References Cited

U.S. PATENT DOCUMENTS

| | | | | |
|---|---|---|---|---|
| 2004/0093125 | A1 * | 5/2004 | Schanin | 700/296 |
| 2005/0043011 | A1 * | 2/2005 | Murray et al. | 455/405 |
| 2005/0178135 | A1 * | 8/2005 | Schanin et al. | 62/228.1 |
| 2007/0125104 | A1 * | 6/2007 | Ehlers | 62/157 |

* cited by examiner

*Primary Examiner* — Kakali Chaki
*Assistant Examiner* — Tejal Gami
(74) *Attorney, Agent, or Firm* — Withrow & Terranova, P.L.L.C.

(57) ABSTRACT

In accordance with an exemplary and non-limiting embodiment of the disclosure, a computer readable medium is encoded with instructions for directing a processor to receive at least one model defining the energy consumption of at least one vending machine as a function of at least one parameter, receive at least one goal comprising a plurality of parameter values within which the at least one vending machine is to operate, and utilize the at least one model and the at least one goal to determine an operation regime for the at least one vending machine.

21 Claims, 4 Drawing Sheets

300

| PRODUCT IDENTIFIER 305 | PRODUCT DESCRIPTION 310 | PRODUCT CATEGORY 315 | ROW POSITION 320 | RETAIL PRICE 325 | MINIMUM SELLING PRICE 330 | COST 335 | ACTUAL (CURRENT) PRODUCT VELOCITY 340 | DESIRED PRODUCT VELOCITY 345 | CURRENT NUMBER IN STOCK 350 |
|---|---|---|---|---|---|---|---|---|---|
| P-123456789 | SNICKERS | CANDY | A1 | $0.75 | $0.40 | $0.20 | 0.5 / DAY | 3.0 / DAY | 5 |
| P-234567891 | MILKY WAY | CANDY | A2 | $0.50 | $0.40 | $0.20 | 0 / DAY | 3.0 / DAY | 4 |
| P-345678912 | M&MS | CANDY | A3 | $0.50 | $0.35 | $0.25 | 0.5 / DAY | 4.0 / DAY | 3 |
| P-456789123 | LAYS | CHIPS | B1 | $0.75 | $0.35 | $0.20 | 0 / DAY | 3.0 / DAY | 6 |
| P-567891234 | DORITOS | CHIPS | B2 | $0.50 | $0.25 | $0.20 | 0.5 / DAY | 2.0 / DAY | 4 |
| P-678912345 | CHEETOS | CHIPS | B3 | $0.75 | $0.35 | $0.27 | 1.0 / DAY | 2.0 / DAY | 5 |
| P-789123456 | SODA X | SODA | C1 | $0.65 | $0.50 | $0.25 | 0.5 / DAY | 3.0 / DAY | 4 |
| P-891234567 | SODA Y | SODA | C2 | $0.65 | $0.50 | $0.20 | 0 / DAY | 2.0 / DAY | 2 |
| P-912345678 | SODA Z | SODA | C3 | $1.00 | $0.75 | $0.30 | 1.0 / DAY | 3.0 / DAY | 2 |

*FIG. 3*

SYSTEM AND METHOD OF OPTIMIZATION FOR VENDING PLATFORMS

The present application claims the benefit of U.S. Provisional Patent Application No. 61/039,138, filed Mar. 25, 2008 in the name of Breitenbach et al. entitled "SYSTEM, METHOD, AND APPARATUS FOR VENDING MACHINE 100 DISCLOSURES INCLUDING: INVENTORY AUTO-PLANOGRAM, WIRELESS MOBILE DRINK SYSTEM, ENERGYSMART ENERGY REDUCTION SYSTEMS, VENDING OPERATOR ACCOUNT PORTAL, CONSUMER ACCOUNT PORTAL AND DISPENSING SYSTEMS AND HARDWARE MODIFICATIONS". This application is incorporated herein by reference in its entirety.

FIELD OF THE INVENTION

The invention generally relates to the optimization of vending platforms. More specifically, the invention relates to a system and method for optimizing the energy consumption of vending machines.

BRIEF SUMMARY

In accordance with exemplary and non-limiting embodiments of the disclosure, a computer readable medium is encoded with instructions for directing a processor to receive at least one model defining the energy consumption of at least one vending machine as a function of at least one parameter, receive at least one goal comprising a plurality of parameter values within which the at least one vending machine is to operate, and utilize the at least one model and the at least one goal to determine an operation regime for the at least one vending machine.

In accordance with another exemplary and non-limiting embodiment of the disclosure, a system comprises a controller and at least one vending machine in communication with the controller comprising a processor encoded with instructions to control the operation of the at least one vending machine in accordance with an operation regime determined at least in part based upon at least one model defining the energy consumption of at least one vending machine as a function of at least one parameter and at least one goal comprising a plurality of parameter values within which the at least one vending machine is to operate.

In accordance with another exemplary and non-limiting embodiment of the disclosure, a method comprises receiving at least one model defining the energy consumption of at least one vending machine as a function of at least one parameter, receiving at least one goal comprising a plurality of parameter values within which the at least one vending machine is to operate, utilizing the at least one model and the at least one goal to determine an operation regime for the at least one vending machine, and storing the operation regime in a database.

BRIEF DESCRIPTION OF THE DRAWINGS

FIG. 3 is a diagram of an exemplary and non-limiting embodiment of a database according to the disclosure.

DETAILED DESCRIPTION

Figure 1:
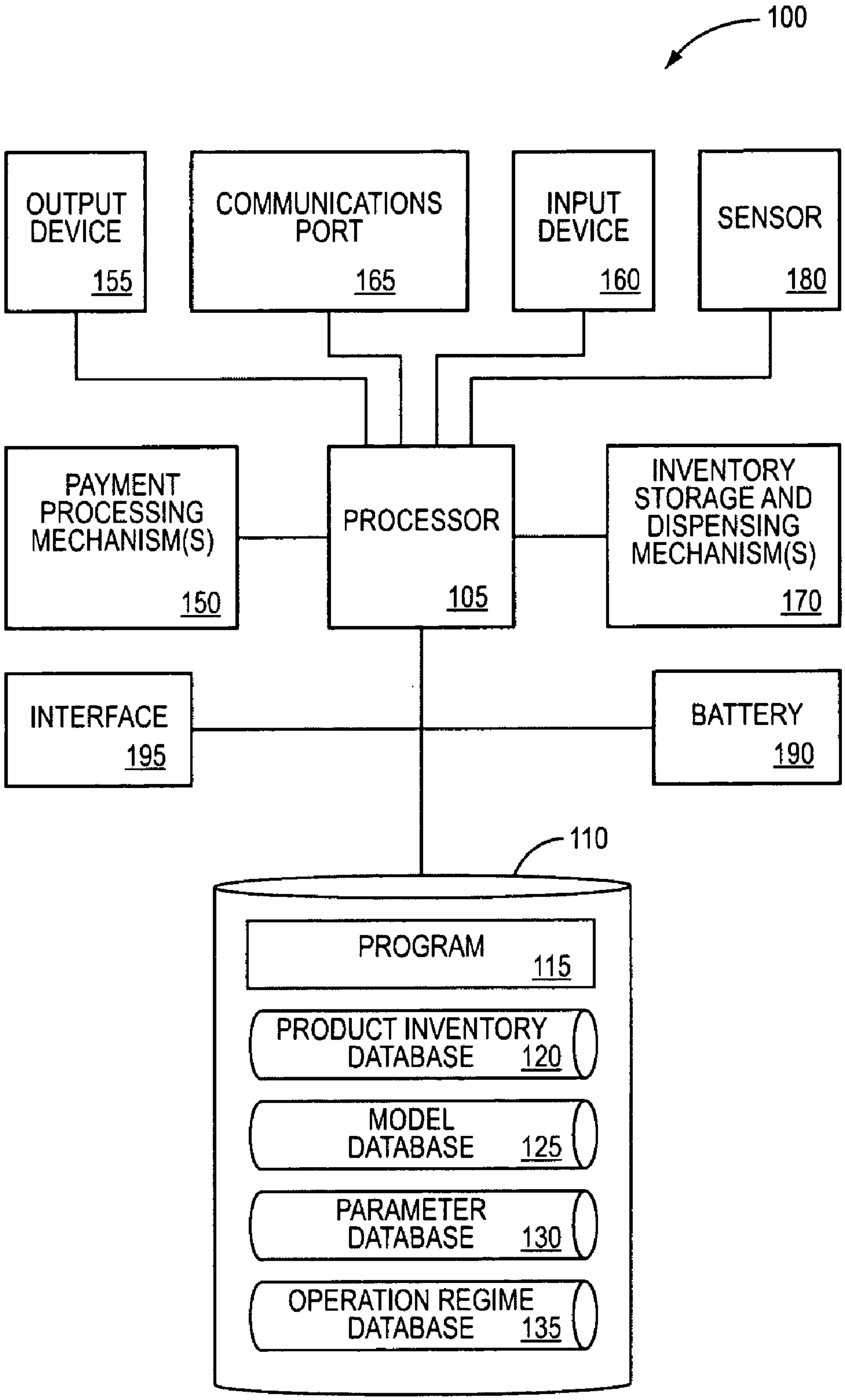
FIG. 1 is a diagram of an exemplary and non-limiting embodiment of a vending machine according to the disclosure.

Existing vending machines 100 offer basic capability for mitigating energy consumption by enabling electronic controlling of the compressor, evaporator fan, and the light. Such vending machines 100 can also employ variable speed compressors which makes the process of cooling the cabinet of the vending machine 100 more energy efficient. More sophisticated systems further employ "low-power" mode options that allow for the cooling system to be shut off or lowered for periods of time. For example, the compressor can be turned off from a control panel for the weekend to save energy when the cabinet is not in active use. Some vending machines 100 extend this concept by allowing a schedule to be stored in or otherwise accessible to a vending machine 100 and used to automatically turn off the cooling system and the lights during certain times without intervention by an operator.

This concept has been further extended to use demand patterns to make such schedules adaptive to demand patterns. However, these advances in energy consumption savings have all proven sub-optimal because they take a one-dimensional approach to the problem. For example, even dynamic schedules based upon demand patterns end up being nothing more than sophisticated on/off switches for the vending machines 100.

To determine the energy use of a vending machine 100, it is necessary to know, at a minimum, the amount of energy required to cool a refrigerated vending machine 100, the pace at which the vending machine 100 absorbs heat when the compressor is off, and how often the vending machine 100 must cool itself. Furthermore, the values of these parameters are unique to each vending machine 100 at each given moment of its existence and depend upon: (1) the current capacity of the vending machine 100, (2) the type of packages in the vending machine 100, (3) the ambient temperature of the room in which the vending machine 100 is situated, (4) the exposure to light of the product in the vending machine 100, (5) the cabinet seal, (6) the efficiency of the circuitry connected to the cooling system, (7) the fill schedule of the vending machine 100, and (8) the desired temperature of the product.

The same vending machine 100, on different days, even with the same demand pattern, may require a different amount of energy to cool itself one degree. For example, the same vending machine 100 may have different capacities at different times, or may contain a different number or distribution of packages. In addition, the environment surrounding the vending machine 100 may be hotter or lighted differently. Furthermore, at one time the operator may have just opened the door to fill the machine raising the internal temperature of the cabinet and requiring the vending machine 100 to do expend more energy to realize an increased amount of cooling at that time.

Similarly, each individual vending machine 100 has a unique "energy footprint", that is unique and which fluctuates over time. For example, were an individual vending machine 100 to be moved to a different physical location having different environmental conditions, the vending machine's 100 footprint would be so different as to appear as a different vending machine 100 from the perspective of energy consumption.

Having recounted some of the complexities involved in the dynamics of energy consumption in refrigerated vending machines 100, it is clear that prior attempts at optimizing such energy consumption fail to address the need for a robust and comprehensive integration of the many parameters required to accurately optimize such energy consumption.

For example, even prior attempts at demand pattern integration have proved a simplistic approach as demand is a phenomenon that affects capacity and fill schedule both of which are ultimately factors that drive energy consumption. In fact, providing extra cooling during periods of high demand may be a sub-optimal strategy as such demand ultimately results in less capacity which actually requires less cooling.

There is therefore provided in accordance with exemplary and non-limiting embodiments of the disclosure a system 200 comprising an intelligent vending machine 100 that monitors energy consumption on a continuing basis and makes decisions about energy use that are weighed against goals set for energy consumption and vending machine 100 sales.

Throughout the description that follows and unless otherwise specified, the following terms may include and/or encompass the example meanings provided in this section. These terms and illustrative example meanings are provided to clarify the language selected to describe embodiments of the disclosure both in the specification and in the appended claims.

The term "energy footprint" refers to the amount of energy required by a device, such as a vending machine 100, at a specified time.

As used herein, the term "optimize" refers to the incremental improvement of a process influenced by one or more parameters over an alternative process influenced by the same one or more parameters. As is evident, an optimized entity need not be the best of all alternative entities having similar parameters. Rather, an optimized entity is one that is at least incrementally better than another such entity as measured against a predetermined criteria or goal.

The term "input device" may refer to a device that is used to receive an input. An input device may communicate with or be part of another device (e.g. a point of sale terminal, a point of display terminal, a customer terminal, a server, a customer device, a vending machine 100, a controller, a peripheral device, etc.). Some examples of input devices include: a barcode scanner, a magnetic stripe reader, a computer keyboard, a point-of-sale terminal keypad, a touch-screen, a microphone, an infrared sensor, a sonic ranger, a computer port, a video camera, a motion detector, a digital camera, a network card, a universal serial bus (USB) port, a GPS receiver, a radio frequency identification (RFID) receiver, a RF receiver, a thermometer, a pressure sensor, and a weight scale.

The term "output device" may refer to a device that is used to output information. An output device may communicate with or be part of another device (e.g. a vending machine 100, a point of sale terminal, a point of display terminal, a customer device, a controller, etc.). Possible output devices include: a cathode ray tube (CRT) monitor, liquid crystal display (LCD) screen, light emitting diode (LED) screen, a printer, an audio speaker, an infra-red transmitter, and a radio transmitter.

The term "operator" may refer to the owner of a vending machine 100, or agent or associate thereof (e.g., a route driver or lessee of a vending machine 100).

The term "peripheral device" may refer to any device associated with one or more vending machines 100, the peripheral device being operable to perform any of the functions described herein. For example, in one embodiment a prior art vending machine may be retrofitted with a peripheral device that comprises a processor, memory, and output device for facilitating promotions in accordance with embodiments of the disclosure. A peripheral device may or may not be attached to a vending machine 100. A peripheral device may or may not be operable to direct the associated vending machine 100 to perform certain functions. A peripheral device, or portions thereof, may be housed inside the casing of the associated vending machine 100. Further, a peripheral device may be operable to detect one or more events at a vending machine 100. For example, a peripheral device may be operable to detect one or more signals output by a processor of a vending machine 100. Further still, a peripheral device may be operable to communicate with a processor of an associated vending machine 100.

The terms "product," "good," "item", "merchandise," and "service" shall be synonymous and may refer to anything licensed, leased, sold, available for sale, available for lease, available for licensing, and/or offered or presented for sale, lease, or licensing including individual products, packages of products, subscriptions to products, contracts, information, services, and intangibles. Examples of goods sold at vending machines 100 include beverages (e.g. cans of soda) and snacks (e.g. candy bars). Examples of services sold by vending machines 100 include car washes, photography services and access to digital content (e.g. permitting the downloading of MP3 files or "ring tunes" to a handheld device).

The terms "server" and "controller" shall be synonymous and may refer to any device that may communicate with one or more vending machines 100, one or more third-party servers, one or more remote controllers, one or more customer devices, one or more peripheral devices and/or other network nodes, and may be capable of relaying communications to and from each.

Generally, a vending machine 100 in accordance with the disclosure may comprise a device, or communicate with a device (e.g., a server, a peripheral device, and/or a peripheral device server), configured to manage sales transactions with customers by, among other things, receiving payment from customers, controlling the pricing and/or distribution of goods and/or controlling entitlements to services.

With reference to FIG. 1, there is illustrated a block diagram of an embodiment of a system consistent with the disclosure. More specifically, FIG. 1 is a block diagram of a vending machine 100 that may be operable to perform one or more functions described herein.

The vending machine 100 may include a processor 105, such as one or more Intel™ Pentium™ processors. The processor 105 may include or be coupled to one or more clocks or timers (not pictured) and one or more communication ports 165 through which the processor 105 may communicate, in accordance with some embodiments, with other devices such as one or more peripheral devices, one or more servers, one or more peripheral devices, and/or one or more user devices. The processor 105 is also in communication with a data storage device 110. The data storage device 110 may include any appropriate combination of magnetic, optical and/or semiconductor memory, and may include, for example, additional processors, communication ports, Random Access Memory ("RAM"), Read-Only Memory ("ROM"), a compact disc and/or a hard disk. The processor 105 and the storage device 110 may each be, for example: (i) located entirely within a single computer or other computing device; or (ii) connected to each other by a remote communication medium, such as a serial port cable, a LAN, a telephone line, radio frequency transceiver, a fiber optic connection or the like. In some embodiments for example, the vending machine 100 may comprise one or more computers (or processors 105) that are connected to a remote server computer operative to maintain databases, where the data storage device 110 is comprised of the combination of the remote server computer and the associated databases.

The data storage device 110 stores a program 115 for controlling the processor 105. The processor 105 performs instructions of the program 115, and thereby operates in accordance with the disclosure, and particularly in accordance with the methods described in detail herein. The disclosure may be embodied as a computer program 115 developed using an object oriented language that allows the modeling of complex systems with modular objects to create abstractions that are representative of real world, physical objects and their interrelationships. However, it would be understood by one of ordinary skill in the art that the disclosure as described herein can be implemented in many different ways using a wide range of programming techniques as well as general purpose hardware systems or dedicated controllers.

The program 115 may be stored in a compressed, uncompiled and/or encrypted format. The program 115 furthermore may include program elements that may be generally useful, such as an operating system, a database management system and device drivers for allowing the processor 105 to interface with computer peripheral devices. Appropriate general purpose program elements are known to those skilled in the art, and need not be described in detail herein.

Further, the program 115 is operative to execute a number of disclosure-specific, objects, modules and/or subroutines which may include (but are not limited to) one or more subroutines to determine operation regimes for one or more vending machines.

According to some embodiments of the disclosure, the instructions of the program 115 may be read into a main memory of the processor 105 from another computer-readable medium, such from a ROM to a RAM. Execution of sequences of the instructions in the program 115 causes processor 105 to perform the process steps described herein. In alternative embodiments, hard-wired circuitry or integrated circuits may be used in place of, or in combination with, software instructions for implementation of the processes of the disclosure. Thus, embodiments of the disclosure are not limited to any specific combination of hardware, firmware, and/or software.

In addition to the program 115, the storage device 110 is also operative to store one or more databases, such as (i) product inventory database 120, (ii) model database 125, (iii) parameter database 130, and (iv) operation regime database 135. The databases are described in further detail below and example structures are depicted with sample entries in the exemplary embodiment of the product inventory database 120 depicted in FIG. 3. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though four databases are illustrated, the disclosure could be practiced effectively using one, two, three, five, or more functionally equivalent databases.

Similarly, the illustrated entries of the databases represent exemplary information only; those skilled in the art will understand that the number and content of the entries can be different from those illustrated herein.

Further, despite the depiction of the databases as tables, an object-based model could be used to store and manipulate the data types of the disclosure and likewise, object methods or behaviors can be used to implement the processes of the disclosure. Examples of some of these processes are described below in detail with respect to FIG. 4.

It should be noted that the term "computer-readable medium" as used herein refers to any medium that participates in providing instructions to a processor for execution. Such a medium may take many forms, including but not limited to, non-volatile media, volatile media, and transmission media. Non-volatile volatile media include, for example, optical or magnetic disks, such as memory. Volatile media include dynamic random access memory (DRAM), which typically constitutes the main memory. Transmission media include coaxial cables, copper wire fiber optics, including the wires that comprise a system bus coupled to the processor. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. Various forms of computer readable media may be involved in carrying one or more sequences of one or more instructions to a processor for execution.

Vending machine 100 may comprise payment processing mechanism(s) 150. The payment processing mechanism(s) 150 may comprise one or more mechanisms for receiving payment and dispensing change, including a coin acceptor, a bill validator, a card reader (e.g. a magnetic stripe reader) and a change dispenser.

In a manner known in the art, a magnetic stripe card reader may read data on the magnetic stripe of a credit or debit card, and it may cooperate with conventional point-of-sale credit card pressing equipment to validate card-based purchases through a conventional transaction authorization network. Suitable card-based transaction processing systems and methods are available from USA Technologies, Inc.™ of Wayne, Pa.

The coin acceptor, bill validator and change dispenser may communicate with a currency storage apparatus (a "hopper"; not shown) and may comprise conventional devices such as models AE-2400, MC5000, TRC200 by Mars, Inc.™ of West Chester, Pa., or CoinCo™ model 9300-L.

The coin acceptor and bill validator may receive and validate currency that is stored by the currency storage apparatus. Further, a bill validator or coin acceptor may be capable of monitoring stored currency and maintaining a running total of the stored currency, as is discussed with reference to U.S. Pat. No. 4,587,984, entitled COIN TUBE MONITOR MEANS, the entirety of which is incorporated by reference herein for all purposes. The change dispenser activates the return of coinage to the customer where appropriate (e.g. where a customer rejects or otherwise fails to accept a dynamically priced upsell offer). Such apparatus may feature Multidrop Bus (MDB) and/or Micromech peripheral capabilities, as is known in the art.

In another exemplary embodiment, a vending machine 100 in accordance with the disclosure may be configured to receive payment authorization and product selection commands through a wireless device communication network, directly or indirectly, from a customer device (e.g. a cellular telephone). In such an embodiment, a payment processing mechanism may comprise a cellular transceiver operatively connected to a processor, as described herein. Systems and methods allowing for the selection of and payment for vending machine 100 articles through cellular telephones are provided by USA Technologies, Inc.™. Further, in such an embodiment, a customer cellular telephone may serve as an input/output device, as described herein.

Further details concerning vending machine 100 payment processing mechanisms are well known in the art, and need not be described in further detail herein.

The vending machine 100 may comprise an output device 155 and an input device 160. It should be understood that, although only a single output device 155 and a single input device 160 is illustrated in FIG. 1, any number of output devices and/or input devices may be used.

In accordance with embodiments of the presenting disclosure, a vending machine 100 may include an input device for receiving input from a (i) a customer indicating a product and/or offer selection, and/or (ii) an operator (or agent thereof) during stocking or maintenance of the vending machine 100. Also, a vending machine 100 may include one or more output devices for outputting product and/or promotion information to a customer or operator.

Many combinations of input and output devices may be employed in accordance with embodiments of the disclosure. For example, in embodiments which feature touch screens (described herein), input and output functionality may be provided by a single device.

As described, a vending machine 100 may include more than one input devices 160. For example, a vending machine 100 may include an exterior input device 160 for receiving customer input and an interior input device for receiving operator input. In some embodiments, however, the input device provides the dual functionality of receiving input data from both operators and customers.

As also described, a vending machine 100 may comprise more than one output device 155. For example, a vending machine 100 may include both a Liquid Crystal Display (LCD) screen and several Light Emitting Diodes (LEDs).

Output device 155 may comprise, for example, an LCD and/or one or more LEDs displays (e.g., several alphanumeric LEDs on the shelves of a vending machine 100, each LED being associated with a row of product inventory).

In one embodiment, an LED display screen may be mounted atop a vending machine 100 (e.g., attached thereto, such as via bolts or other mounting hardware). Such a mounted LED display screen may be used to communicate promotions and other messages (e.g., product advertisements) to prospective customers. A suitable LED display screen for such an embodiment may be housed in an aluminum case having a length of 27.5", a height of 4.25", and a depth of 1.75". Such a display screen may have a display area capable of showing 13 alphanumeric and/or graphical characters. Further, such an LED display screen may comprise a serial computer interface, such as an RJ45/RS232 connector, for communicating with a processor, as described herein. Further still, such an LED display may be capable of outputting text and graphics in several colors (e.g., red, yellow, green, black) regarding current and upcoming promotions.

Further, in some embodiments, an output device comprises a printer. In one embodiment, a printer is configured to print on card stock paper (e.g. 0.06 mm to 0.15 mm thickness), such as the EPSON EU-T400 Series Kiosk Printer. Further, a printer may be capable of thermal line printing of various alphanumeric and graphical symbols in various font sizes (e.g. raging from 9 to 24 point) on various types of paper. Additionally, such a printer may communicate with a processor (described herein) via an RS232/IEEE 12834 and/or bi-directional parallel connection. Such a printer may further comprise a 4 KB data buffer.

Additionally, in some embodiments, an output device comprises an audio module, such as an audio speaker, that outputs information to customers audibly.

Input device 160 may comprise one or more of (1) a set of alpha-numeric keys for providing input to the vending machine 100, such as the Programmable Master Menu™ Keypad, (2) a selector dial, (3) a set of buttons associated with a respective set of item dispensers, (4) a motion sensor, (5) a barcode reader, (6) a voice recognition module, (7) a Dual-Tone Multi-Frequency receiver/decoder, (8) a wireless device (e.g. a cellular telephone or wireless Personal Digital Assistant), and/or (9) any other conventional input device commonly employed by a vending machine 100 designer.

As described, in some embodiments, a touch-sensitive screen may be employed to perform both input and output functions. Suitable, commercially available touch screens for use in accordance with the disclosure are manufactured by Elo TouchSystems, Inc.υ, of Fremont, Calif., such as Elo's AccuTouch™ series touch screens. Such touch screens may comprise: (i) a first (e.g., outer-most) hard-surface screen layer coated with an anti-glare finish, (ii) a second screen layer coated with a transparent-conductive coating, (iii) a third screen layer comprising a glass substrate with a uniform-conductive coating. Further, such touch screens may be configured to detect input within a determined positional accuracy, such as a standard deviation of error less than +/−0.080-inch (2 mm). The sensitivity resolution of such touch screens may be more than 100,000 touchpoints/$in^2$ (15,500 touchpoints/$cm^2$) for a 13-inch touch screen. For such touch screens, the touch activation force required to trigger an input signal to the processor (described herein) via the touch screen is typically 2 to 4 ounces (57 to 113 g). Additionally, touch screens for use in accordance with embodiments of the disclosure may be resistant to environmental stressors such as water, humidity, chemicals, electrostatic energy, and the like. These and other operational details of touch screens (e.g., drive current, signal current, capacitance, open circuit resistance, closed circuit resistance, etc.) are well known in the art and need not be described further herein.

Vending machine 100 may further comprise one or more inventory storage and dispensing mechanism(s) 170. Product inventory storage and product dispensing functions of a vending machine 100 configured in accordance with a snack machine embodiment of the disclosure may include one or more of: (i) a drive motor, (ii) metal shelves, (iii) a product delivery system (e.g. a chute, product tray, product tray door, etc.), (iv) dual spiral (i.e. double helix) item dispensing rods, (v) convertible (i.e. extendable) shelves, and/or (vi) a refrigeration unit.

Inventory storage and dispensing mechanism(s) 170 may comprise one or more of: (i) metal and/or plastic shelving, (ii) item dispensing actuators/motors, (iii) product delivery chutes, and/or (iv) a refrigeration unit. Further details concerning vending machine 100 inventory storage and dispensing mechanisms are well known in the art, and need not be described in further detail herein.

Vending machine 100 may further comprise one or more sensors 180. Sensors 180 may be used to measure or to determine any and all factors relevant to the energy consumption of a vending machine 100. Exemplary factors include, but are not limited to, ambient temperature around the vending machine 100, light intensity, component orientation (e.g., cabinet door close status), and the like. Sensors 180 may form a part of vending machine 100 or operate external to vending machine 100. Sensors 180 may store measurements in a database accessible to the vending machine 100 or to controller 205.

Figure 2:
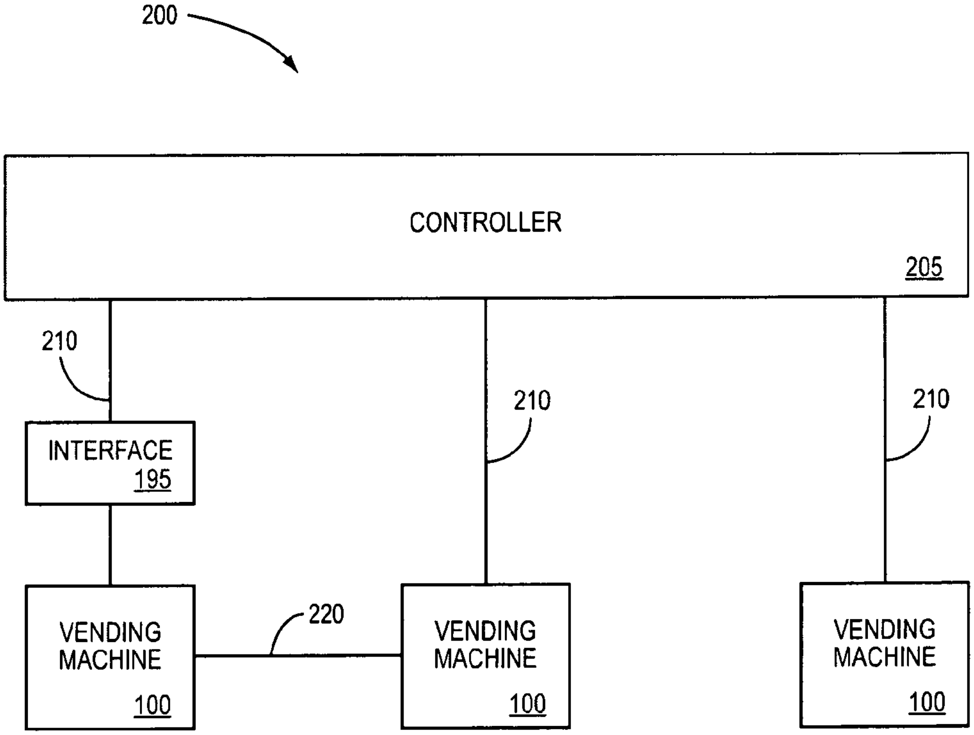
FIG. 2 is a diagram of an exemplary and non-limiting embodiment of a system according to the disclosure.

Referring now to FIG. 2, a block diagram of a system 200 according to at least one embodiment of the disclosure includes a controller 205 that is in communication, via a communications network 210, with one or more vending machines 100. The controller 205 may communicate with the vending machines 100 directly or indirectly, via a wired or wireless medium such as the Internet, LAN, WAN or Ethernet, Token Ring, or via any appropriate communications means or combination of communications means. Each of the vending machines 100 may comprise computers, such as those based on the Intel™ Pentium™ processor, that are adapted to communicate with the controller 205. Any number and type of vending machines 100 may be in communication with the controller 205.

Communication between the vending machines 100 and the controller 205, and among the vending machines 100 (which communicate via communication network 210), may be direct or indirect, such as over the Internet through a Web site maintained by controller 205 on a remote server or over an on-line data network including commercial on-line service providers, bulletin board systems and the like. In yet other embodiments, the vending machines 100 may communicate with one another and/or controller 205 over RF, cable TV, satellite links and the like.

Some, but not all, possible communication networks that may comprise network 210 or be otherwise part of system 200 include; a local area network (LAN), a wide area network (WAN), the Internet, a telephone line, a cable line, a radio channel, an optical communications line, a satellite communications link. Possible communications protocols that may be part of system 200 include: Ethernet (or IEEE 802.3), SAP, ATP, Bluetooth™ and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In an embodiment, the controller 205 may not be necessary and/or preferred. For example, the disclosure may, in one or more embodiments, be practiced on a stand-alone vending machine 100 and/or a vending machine 100 in communication only with one or more other vending machines 100. In such an embodiment, any functions described as performed by the controller 205 or data described as stored on the controller 205 may instead be performed by or stored on one or more vending machines 100.

It should be noted that, in the embodiment of FIG. 2, some of the functionality described with reference to FIG. 1 as being performed by vending machine 100 may instead or in addition be performed by controller 205. Similarly, any data described with reference to FIG. 1 as being stored in a memory of vending machine 100 may, in the embodiment of FIG. 2, be instead or in addition stored in a memory of controller 205. For example, data associated with past environmental and energy consumption parameters associated with a vending machine 100 may be stored in a memory of controller 205.

It should further be noted that controller 205 may comprise one or more computing devices (e.g., working in cooperation with one another) that may or may not be located remotely to one another or remotely to one or more of the vending machines 100.

Figure 4:
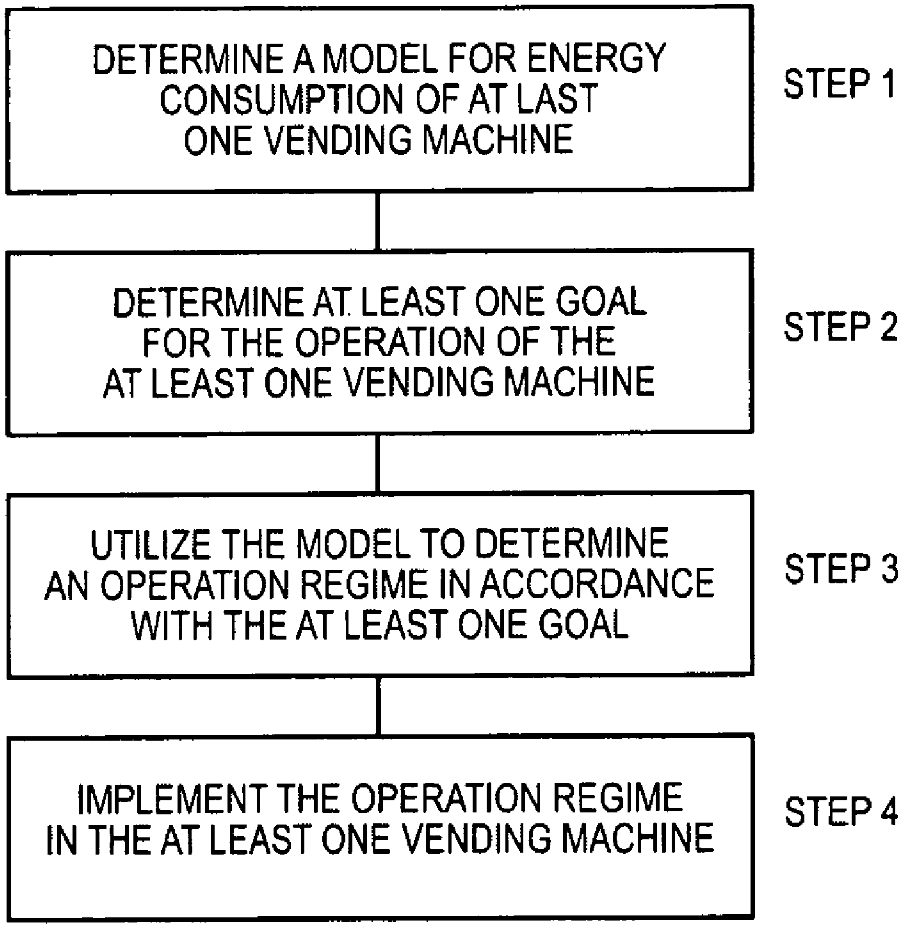
FIG. 4 is a flowchart of an exemplary and non-limiting embodiment of a method according to the disclosure.

With reference to FIG. 4, there is illustrated a method in accordance with an exemplary and non-limiting embodiment of the disclosure. At step 1, the system 200 determines at least one model for the energy consumption of at least one vending machine 100. As described more fully below, the model allows the system 200 to predict the energy consumption of a vending machine 100 under a variety of circumstances represented by endogenous and exogenous parameters. At step 2, there is determined at least one goal for the operation of the at least one vending machine 100. At step 3, the at least one model is utilized to determine an operation regime in accordance with the at least one goal for the at least one vending machine 100. At step 4, the operation regime is implemented on the at least one vending machine 100.

With specific reference to step 1, one or more models are determined. As described more fully below, each model defines the behavior of at least one component of the operation of a vending machine 100 in terms of at least one other component of the vending machine 100. For example, a model may define the energy required to cool the cabinet of a vending machine 100 by one degree given a predefined capacity of the vending machine 100. As described more fully below, such models may be computed, determined, defined, and improved based upon actual measurements related to the operation of one or more vending machines 100 or they may be based upon theoretical calculations of the behavior of one or more parameters related to the operation of a vending machine 100.

As used herein, "endogenous parameters" refers to parameters that relate directly to the operation of a vending machine 100, the status of a vending machine 100, and/or which may be altered by the system 200. Examples of endogenous parameters include, but are not limited to, the product capacity of a vending machine 100, the orientation of a door of a vending machine 100, and the like. Conversely, as used herein, "exogenous parameters" refers to parameters whose values are not directly alterable by the system 200. Examples of exogenous parameters include, but are not limited to, ambient temperature, sun brightness, and the like. These parameters, both endogenous and exogenous, may be stored, for example, in parameter database 125.

In addition to parameter database 125, the system 200 may make use of any number of other databases in which is stored information regarding the status or state of a vending machine 100, wherein all of such information may likewise be used as parameters when computing or determining models as described more fully below. In exemplary and non-limiting embodiments, the vending machine 100 can determine its capacity by referencing an inventory management system that identifies not only the product in each slot but the depth of each product with each slot.

In some embodiments, the inventory management system comprises a product inventory database 120. With reference to FIG. 3, there is illustrated a tabular representation of an embodiment 300 of the product inventory database 120. The tabular representation 300 of the product inventory database includes a number of example records or entries, each of which defines a product available for sale from a vending machine 100. Those skilled in the art will understand that the product inventory database may include any number of entries. The tabular representation of product inventory database also defines fields for each of the entries or records. The fields specify, for example, (i) a product identifier, or SKU, 305 that uniquely identifies the product; (ii) a product description 310 that describes the product; (iii) a product category 315 into which the product has been categorized; (iv) a row position 320 that identifies a particular row (and, optionally, a particular position within a particular row) of the vending machine 100 in which the product is located; (v) a retail price 325 of the product; (vi) a minimum selling price 330 of the product; (vii) a cost 335 of the product; (viii) an actual (current) product velocity 340; (ix) a desired product velocity 345; and (x) a current number in stock 350 that indicates a number of the product currently available for sale.

The product inventory database may be populated, for example, when an operator of the vending machine 100 associated with the database adds products to the vending machine 100 (e.g., the operator may enter a number of each product entered using a keypad of the vending machine 100 or a bar code scanner in communication with the vending machine 100). The product inventory database may also be updated when a product is dispensed from the vending machine 100 associated with the database.

It should be noted that, in some embodiments, the product inventory database may store information associated with more than one vending machine 100. This may occur, for example, if the product inventory database is stored in controller 205. In such embodiments, the product inventory database may store a vending machine 100 identifier in association with one or more records.

In accordance with exemplary and non-limiting embodiments, the product identifier 305 of the product inventory database 120 can be used to identify the package type associated with an individual product (e.g., carbonated 12 oz. aluminum can, carbonated 20 oz plastic bottle, non-carbonated 20 oz glass bottle, etc.) either by reference to product inventory database 120 or by reference to another database, such as might be stored on data storage device 110.

As a result, an energy consumption factor can be determined as associated with each product in each slot of a vending machine 100. This energy consumption factor may be stored, for example, in product inventory database 120 or computed as needed, such as by processor 105. In addition to the fields described above with reference to each record in product inventory database 120, any number of additional fields may be stored including, for example, real time transaction data. For example, each time a user dispenses a product from the vending machine 100 the system 200 captures and stores the product that was dispensed, the slot from which the product was dispensed, and the time at which the product was dispensed, even down to the millisecond. Additionally, each time an operator fills the vending machine 100, the inventory is adjusted to the level that the vending machine 100 is filled to. All of this information is stored in a database or databases accessible by the vending machine 100. This information may also be transmitted to a central server, or controller, 205 that tracks this data for all vending machines 100.

As a result, the system 200 can determine a model, for example, that computes a theoretical energy consumption factor based upon the known composition of the products in a vending machine 100.

In yet other exemplary and non-limiting embodiments, the system 200 is capable of ascertaining various physical aspects and parameters of a vending machine 100 and storing such information. For example, a vending machine 100 can identify when its door is open. The vending machine 100 can also recognize when the compressor is on or off, as well as the evaporator fan, and the light. The vending machine 100 may further be capable of measuring the temperature in the cabinet. The vending machine 100 may poll for this information at predetermined intervals or as needed. Once measured or otherwise recorded, this information may be stored in a database or databases accessible by both the vending machine 100 and the controller.

In exemplary and non-limiting embodiments, the vending machine 100 may function in accordance with an operational temperature range. For example, a vending machine 100 may be instructed to turn the compressor off at temperature A and turn it on at temperature B (e.g., turn off at 38 degrees F. and turn on at 44 degrees F.). Similarly, the vending machine 100 may access the energy "rate card" for the energy market it is in by, for example, retrieving a rate card value from a database. The rate card can identify the cost of energy for peak and non-peak periods.

As a result of capabilities described above, the vending machine 100 is able to determine, for example, the temperature of the cabinet at both a desired moment in time and over a period of time in the past, the capacity of each product in the vending machine 100 at the aforementioned times, and the package type of each product.

Utilizing the determined information, the system 200 can determine a model based upon actual measurements of parameters recorded during operation of a vending machine 100 or machines. For example, a vending machine 100 can determine a duration of time necessary to cool the cabinet of the vending machine 100 during a cooling period during which the temperature of the vending machine 100 cabinet moves from degree (n) to degree (n−1). Furthermore, it is possible to compute or otherwise determine the energy consumption of the vending machine 100 during the cooling. Specifically, the system 200 can compute the energy consumption over the cooling period using as inputs the time and the product makeup of each slot in the vending machine 100 in terms of depth, the package type of each such product, the state of the compressor, the light, and the evaporator fan, and the energy the energy consumption of all components in the machine.

In addition to calculating the energy consumption of the vending machine 100 during the cooling period, the energy consumption can likewise be ascertained by metering or otherwise measuring the actual energy inputs to the vending machine 100 during the cooling period and storing this metered data.

Likewise, when the compressor is not running the cabinet will rise in temperature. The vending machine 100 can determine how long it takes for the temperature in the cabinet to rise during a warming period from degree (n) to (n+1). As a result, the vending machine 100 can determine at what time the compressor would need to turn back on to keep the cabinet of a vending machine 100 cooled to a desired temperature.

From these data points comprising the energy consumption during both cooling and warming periods, the system 200 can determine and predict how much energy is required to maintain a cabinet of a vending machine 100 operating within a desired temperature operation range at the current capacity composition by calculating the times the compressor should turn off and turn on.

To supplement these predictions the system 200 may utilize one or more sensors 180, such as one comprising an external thermometer, to measure the ambient temperature of the room in which the vending machine 100 is situated. In exemplary embodiments, this measurement of ambient temperature may provide an additional data point for use in predicting or otherwise determining the amount of time required to achieve a desired temperature as the duration of time depends upon how the total amount of energy is in the system 200 which includes the ambient temperature.

While the aforementioned measurements, values, and parameters might be sufficient to determine energy consumption and cooling and warming period durations if the vending machine 100 capacity is held constant and if the door of the vending machine 100 remains closed for all time, in practice neither of these constraints can be assumed to remain constant. Rather, every dispense of product changes the capacity composition of the vending machine 100 and, each time the operator has to fill the vending machine 100, the door is opened and the cabinet is heated.

Therefore, in addition to accurately modeling the behavior of one or more vending machines 100 in response to differing parameters, the system 200 further models the likely values of such parameters in the future. Such models of future values comprise predictions. In short, to optimize the operation of a vending machine 100 it is necessary to know how each parameter value changes in response to changes in each other parameter. However, a model that determines the static state of a vending machine 100 in equilibrium when all parameter values are held constant may not adequately predict the operation of a vending machine 100. Specifically, it may be necessary to model changes in parameters that are likely to occur during the course of a vending machine's 100 operation and use such predictions of future parameter values as inputs to established models. For example, a first model may be used to predict future demand with the results of the first model used as inputs to a second model that determines the change in temperature arising from a change in product composition.

In exemplary and non-limiting embodiments of the disclosure, the vending machine 100 and system 200 track demand patterns and accurately predict when sales will occur. For example, the system 200 may predict the time over which an amount (n) of product (x) from slot (y) will be dispensed over time (t). This data can be used to map out the capacity of the machine at any desired time period at any desired degree of granularity, such as at each millisecond. In addition, the system 200 can determine when an operator will refill the vending machine 100. For example, a manual refill schedule can be retrieved, as from a database, and be communicated to the vending machine 100. Using this data, the system 200 can determine energy consumption predictions for any desired time period that take into account reductions in capacity due to dispensing product, increases in capacity due to operator filling, cabinet temperature increases attributable to the fill period, and the resulting capacity after the fill.

All of this information can be stored in a database associated with a vending machine 100 or in a database accessible by controller 205. In accordance with exemplary and non-limiting embodiments, the ability of the system 200 to predict the energy consumption of one or more vending machines 100 based upon movements in capacity and demand, intelligent algorithms can be utilized to optimize energy consumption as described more fully below.

With reference to step 2, in exemplary and non-limiting embodiments, the system 200 provides an interface 195 (FIG. 1), such as one forming part of input device 160, for the input of energy consumption parameter values and ranges. Via this interface 195 a user of the system 200 is given a set of "dials" or other graphical controls to guide the user to select parameter ranges. These dials may include, for example, energy consumption, energy cost, desired sales levels, a lowermost temperature range, and an uppermost temperature range. Taken together, these desired parameter values and ranges form a goal. Each goal establishes parameters within which a vending machine 100 or machines is to remain while executing an operation regime, described more fully below. In addition to a goal associated with the operation of a single vending machine 100, a goal may comprise a meta-goal. As used herein, a "meta-goal" refers to a goal that applies to more than one vending machine 100 such as a plurality of vending machines 100 associated with one another via a network 210, 220.

In exemplary embodiments, one or more parameters may be designated as having acceptable maximum or minimum values or an acceptable range of values. These designations form constraints on the desired operation of the system 200. Utilizing the models described above, the system 200 can determine whether or not there exists a solution for operating a vending machine 100 or machines that meets the constraints specified in the goal. It is understood that maintaining a constant value or range for one or more parameters may affect the energy consumption of the vending machine 100 as well as the sales of the vending machine 100.

For example, the energy consumption of a vending machine 100 may be set at a maximum of 5.5 KWh per day, while the energy cost may be set to $100 per month, and the temperature range may be set to a range between 38 degrees and 48 degrees F. The system 200 may proceed to model the energy consumption based upon a predicted capacity pattern. If there is not enough historical data to accurately predict a capacity pattern, a demand pattern and operator fill schedule can be supplied to the system 200 or vending machine 100.

By holding at least one variable steady the model can determine whether the vending machine 100 can achieve the desired goal of the at least one variable given the values and ranges of the other parameters. For example, it may be that the goal can be met, or it may be that the goal is exceeded, or that the goal can be met with sufficient room to spare. For example, given the parameter settings above, it may be that the goal of consuming no more than 5.5 KWh per day cannot be achieved because the capacity makeup of the vending machine 100 requires too much filling and too many periods where the vending machine 100 must be kept within the temperature operating range. It may be the case that by adjusting the other parameters, perhaps via the dials, the goal can be met. Alternatively, the energy consumption goal might be met by raising the operating temperature of the vending machine 100 during all or some periods of consumption.

It should be noted that such an increase in temperature may have an impact on sales which might violate a constraint placed upon sales. For example, as the temperature increases in the vending machine's cabinet, consumers typically desire to purchase less product. As a result, energy consumption may be achieved at a desired level or within an acceptable range with a resultant unacceptable diminution in sales.

In exemplary embodiments, each dial is used to set an acceptable limit for the parameter of the system 200 it represents thus creating a set of rules under which creation of an operation regime can take place. With reference once again to step 3, the system 200 utilizes the models to determine an operation regime in accordance with the defined goals for a vending machine 100 or machines. Specifically, the system 200 utilizes algorithms to compute a best fit solution for operating at least one vending machine 100 such that the parameters associated with its operation do not violate the predefined goals. Such algorithms may themselves represent models and, hence, the terms "algorithm" and "model" may be used interchangeably. Likewise, algorithms may be stored in model database 125. It is well known to model and/or predict desired outcomes based upon a body of historic input and output parameters. Examples of means to create such predictions include, but are not limited to expert systems, neural networks, and the like.

As described above, the models and algorithms used to accept both endogenous and exogenous variables associated with the operation of a vending machine 100 and output predictions of various aspects of the vending machine's 100 operation may rely in turn on historic performance data, the theoretical expected performance of all aspects of the system 200, as well as a combination of the two. As a result, exemplary implementations of the system's algorithms that rely on, for example, expert systems, neural networks, and the like, can incorporate new measurements as they become available and adjust the operation of the algorithms to more accurately predict future performance. For example, for each instance of dial settings, the vending machine 100 can measure how well the predictions were met by the predicted demand and adjust future predictions of performance accordingly.

In addition, when the determined parameter settings prove incapable of delivering the predicted and/or desired performance, the vending machine 100 can determine the factor or factors contributing to the missed prediction. For example, faulty predictions may be the result of unanticipated changes in capacity due to unexpected demand. Such faulty predictions may further result from a longer time period for cooling than expected, or a shorter period for heat absorption than was predicted based upon the existing capacity makeup. Over time, the system 200 can track statistically its ability to predict vending machine 100 performance parameters and assign a confidence level to such predictions based upon prior performance.

Such variations in prediction may be due to several factors that can be mitigated by the integration of additional data, other than that described above, into the system 200. For example, unanticipated demand that leads to unexpected changes in capacity composition and unanticipated fills could be due to changes in temperature since cold beverages typically sell more in hot weather than in cold, and different types of products will sell differently during these periods as well. To predict effectively vending machine 100 performance, the vending machine 100 may be fed, for example, with weather forecast data and this data can be potentially correlated with changes in demand pattern. When such changes in demand patterns occur due to these factors and the vending machine 100 can identify a correlation, the algorithms employed to determine or otherwise produce predictions can be altered to effectively make use of the additional data to adjust the predicted demand pattern and therefore adjust the predicted capacity makeup of the machine.

Such correlations may be due to seasonality factors identified by the system 200 so that, from month to month, the assumptions underlying predictions change. Another exemplary embodiment of the system 200 involves the system 200 tracking changes in cabinet operating temperature to changes in demand. Such changes may help the machine identify correlations between changes in cabinet operating temperature and sales of beverages from the machine. Such information may help a user of the system 200 to know how to set the dials and/or parameters of the system 200. For example, if the system 200 has learned or otherwise determined that raising the operating temperature to range (X1 to Y1) has a sales impact of Z1, and such an impact would violate the a defined sales goal parameter, then the system 200 could warn the user or outright prevent the change in defined parameters.

As noted above, the system 200 utilizes the stored models and predetermined goals to determine an operation regime. An operation regime is a defined mode of operation whereby one or more vending machines 100, operating in accordance with the operation regime, may operate within the constraints of the defined goals. For example, an operation regime may define the times at which a compressor of a vending machine 100 is to be turned off and on to optimize the vending machine's performance. Once computed, an operation regime may be stored in operation regime database 135 for access by a vending machine 100. Operation regimes may define operation parameters to be employed when operating a vending machine 100 over a period of time extending into the future.

In accordance with exemplary and non-limiting embodiments of the disclosure, general policies may be incorporated when determining an operation regime in accordance with at least one goal. As used herein, "policies" may comprise constraints on the possible parameter values that comprise goals. For example, the system 200 may be guided by policies that manage the task of setting the dials and parameters as well as help to achieve the specified goals. One exemplary policy comprises establishing blackout periods when the system 200 turns off the cooling system and the lights of the vending machine 100. Such blackouts may be preferred or desired during federal holidays, weekends, nights, special off days for the location, etc., and may be customizable to each location.

Another exemplary policy relates to the operation of the vending machine 100. For example, if the machine knows the operator is visiting within a short period of time and the door will be opened, then the operating temperature could be adjusted to not "waste" time and energy cooling a cabinet that will be heated when the door opens. In such an instance, the system 200 might go into blackout mode during this period. Similarly, if the operator does not arrive within the expected time period, the vending machine 100 could override this policy. Additionally, the user of the system 200 could also override it.

In accordance with yet another exemplary embodiment, policies could be related to the product or products. For example, the system 200 can determine the presence of perishable product via access to SKU level data stored in a database. Each product can be accorded its own acceptable operating temperature range and the system 200 can prevent the dials or user specified parameters from violating these policies and thus allowing product to spoil. For example, a vending machine 100 containing milk would not want to allow the cabinet to heat to point (x) for time (t) and, thus, the system 200 would operate to prevent such a condition from arising.

In accordance with yet another exemplary embodiment, policies may be based upon the "rate card" of the machine. To meet the an energy cost goal, the vending machine 100 may search for opportunities to cool the machine during non-peak periods when energy rates are typically reduced. The machine could have different operational temperature rates for peak and non-peak times to help mitigate costs. It may be that it is cheaper to cool the cabinet in the morning as the machine moves from a non-peak to peak period. Note that this cooling regime may run counter to that which would be determined were one to take into account the predicted demand for the vending machine 100. This may arise, for example, because demand during the morning might be low, but the cost to cool the vending machine 100 is much less and if the machine cools during this period and is determined to have an acceptable rate of heat absorption for its capacity composition then the vending machine 100 could predict this as the most cost efficient method for cooling the cabinet.

At step 4, the operation regime is implemented at a vending machine 100. In some exemplary embodiments, the operation regime is stored in operation regime database 135 for retrieval by the processor 105. The processor 105 proceeds to vary the parameters of the vending machine 100 in accordance with the operation regime. In other exemplary embodiments, the controller 205 may access an operation regime and control the operation of the vending machine 100. In some exemplary embodiments, such control may be achieved via an interface 195 as illustrated in FIG. 1. The interface may be an integral part of a vending machine 100 or may be form a retrofit to an existing vending machine 100. In either event, interface 195 receives operation instructions from a source external to the vending machine 100, such as controller 205, and instructs the operation of at least one parameter of a vending machine 100, such by turning a compressor on and off in accordance with an operation regime.

In exemplary and non-limiting embodiments, the vending machine 100 may also be outfitted with a rechargeable battery 190 (FIG. 1), which is recharged during non-peak time periods, when energy consumption costs less, and then switches to battery operation during peak periods. The battery may be used to supplement energy consumption or completely run the vending machine 100 if the energy requirements of the machine during the peak periods are within the energy production capability of the battery for the time period needed. This "hybrid" vending machine 100 configuration could further supplement its energy sources by incorporating other sources of energy such as solar or geo-thermal energy.

As described and illustrated above, the vending machine 100 may communicate via communication networks 210, 220 which may involve communication via the internet and, as a result, all of the data measured, acquired, and stored at or by the vending machine 100, including energy and sales statistics, may be transmitted and stored centrally at, for example, controller 205. The controller aggregates all information from all of the vending machines 100 on the network 210, 220. This configuration provides several additional opportunities for optimizing energy consumption.

In exemplary and non-limiting embodiments, the data available to the system 200 for determining and improving algorithms for making predictions related to the operation of a vending machine 100 may take advantage of the networked nature of multiple vending machines 100. For example, each vending machine 100 has access to data related to predictions associated with itself as well as to data associated with predictions and performance associated with other vending machines 100 in the network.

At the network level, demographic information can be applied to the predictions of each vending machine 100 at each different capacity makeup and the system 200 can ascertain correlations to improve the predictive ability of all vending machines 100 in the network as well as shorten the learning period for new vending machines 100.

In accordance with other exemplary embodiments, the system 200 utilizes the networked vending machines 100 to enable network level goal setting or dial setting. Specifically, among groups of vending machines 100, some within the group easily achieve performance goals while other vending machines 100 struggle to achieve the goal. Together, however, a plurality of vending machines 100 may achieve an energy meta-goals such as, for example, operating at or below a threshold value for the total amount of energy costs across the plurality of vending machines 100. For example, it might be more acceptable to "turn off" vending machines 100 within a network of vending machines 100 if there are other nearby vending machines 100 from which consumers can purchase product during predefined periods. In essence, organizations and users of the system 200 may designate "brown out" periods for some of the vending machines 100 to meet the overall energy meta-goals without sacrificing sales or customer satisfaction.

The networking of vending machines 100 as described above further enables meeting meta-goals across the network in accordance with any manner of arbitrary constraints. For example, energy savings realized by the system 200 as a result of predicting energy consumption needs and meeting such needs in an optimized manner across the network may be utilized to relax energy consumption parameters of specific vending machines 100. If organization A is operating under governmental standards for energy consumption via a number of vending machines 100 under their control, organization A may be able to sell the "under utilization" to organization B operating one or more vending machines 100 that are, alone or in concert, consuming too much energy. In one embodiment, organization B may seek to purchase "carbon credits" to off set its over consumption thus mitigating its risk. Also, because the vending machines 100 are networked, the interface for defining goals may be on a vending machine 100 or may reside in a centralized entity, such as the controller 205, accessible, for example, via an Internet application.

In short, the present disclosure provides methods and techniques to facilitate forecasting energy usage within a vending machine and operating the vending machine so as to comply with desired goals.

What is claimed:

1. A non-transitory computer readable medium encoded with instructions for directing a processor to:

receive at least one model defining an amount of energy required to cool at least one vending machine one degree as a function of at least one parameter;

receive at least one goal comprising a plurality of parameter values within which the at least one vending machine is to operate, wherein at least one of the plurality of parameters forming the at least one goal is constrained by at least one policy; and utilize the at least one model and the at least one goal to determine an operation regime for the at least one vending machine.

2. The computer readable medium of claim 1 wherein the processor is further directed to implement the operation regime on the at least one vending machine.

3. The computer readable medium of claim 1 wherein the at least one model is determined based upon a computed response of the at least one vending machine to a change in at least one of the plurality of parameter values.

4. The computer readable medium of claim 1 wherein the at least one model is determined based upon a measured response of the at least one vending machine to a change in at least one of the plurality of parameter values.

5. The computer readable medium of claim 1 wherein the at least one policy defines a value of at least one parameter required to prevent a product from perishing.

6. The computer readable medium of claim 1 wherein the at least one policy defines a rate card of the at least one vending machine.

7. A system comprising:

a controller; and at least one vending machine in communication with the controller comprising:

a processor encoded with instructions to control the operation of the at least one vending machine in accordance with an operation regime determined at least in part based upon at least one model defining an amount of energy required to cool the at least one vending machine one degree as a function of at least one parameter and at least one goal comprising a plurality of parameter values within which the at least one vending machine is to operate, wherein at least one of the plurality of parameters forming the at least one goal is constrained by at least one policy.

8. The system of claim 7 further comprising a model database in which is stored the at least one model and which is accessible to at least one of the controller and the at least one vending machine.

9. The system of claim 7 further comprising a parameter database in which is stored the at least one parameter defining the energy consumption of at least one vending machine.

10. The system of claim 7 further comprising an operation regime database in which is stored the operation regime.

11. The system of claim 7 further comprising an interface through which the controller can control the value of at least parameter of the at least one vending machine.

12. The system of claim 11 wherein the at least one parameter value is a status of a compressor of the vending machine.

13. The system of claim 7 wherein the at least one model is determined based upon a computed response of the at least one vending machine to a change in at least one of the plurality of parameter values.

14. The system of claim 7 wherein the at least one model is determined based upon a measured response of the at least one vending machine to a change in at least one of the plurality of parameter values.

15. The system of claim 7 wherein the at least one policy defines a value of at least one parameter required to prevent a product from perishing.

16. The system of claim 7 wherein the at least one policy defines a rate card of the at least one vending machine.

17. A method comprising:

receiving at least one model defining an amount of energy required to cool at least one vending machine one degree as a function of at least one parameter;

receiving at least one goal comprising a plurality of parameter values within which the at least one vending machine is to operate, wherein at least one of the plurality of parameters forming the at least one goal is constrained by at least one policy;

utilizing the at least one model and the at least one goal to determine an operation regime for the at least one vending machine;

storing the operation regime in a database; and controlling the vending machine in accordance with the operation regime.

18. The method of claim 17 further comprising retrieving the operation regime from the database and implementing the operation regime on the at least one vending machine.

19. The method of claim 17 wherein the at least one parameter comprises an energy consumption factor associated with at least one product in the at least one vending machine.

20. The method of claim 17 wherein the at least one parameter comprises an expected demand for product within the at least one vending machine.

21. The method of claim 17 wherein the at least one parameter comprises an expected door opening event during a restock event.

* * * * *